L. C. GERMAIN.
TRANSMISSION.
APPLICATION FILED DEC. 2, 1918.

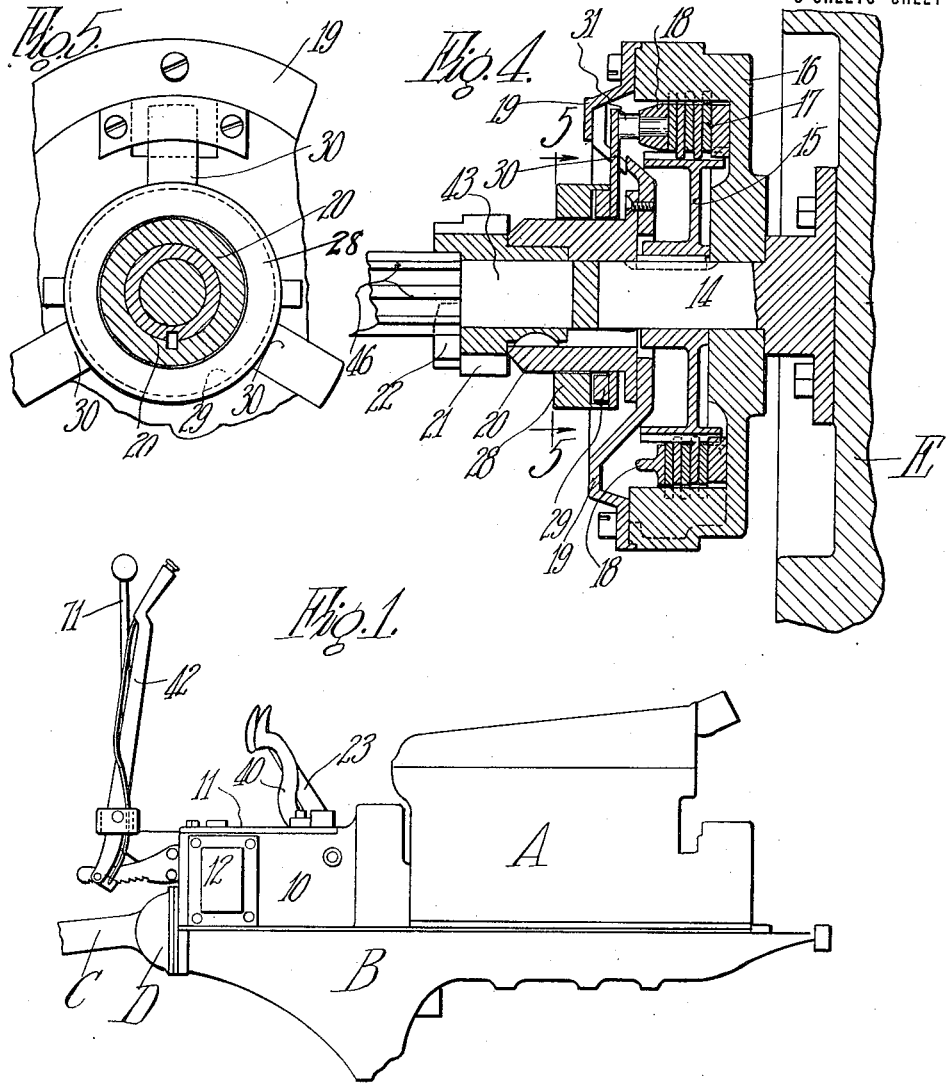

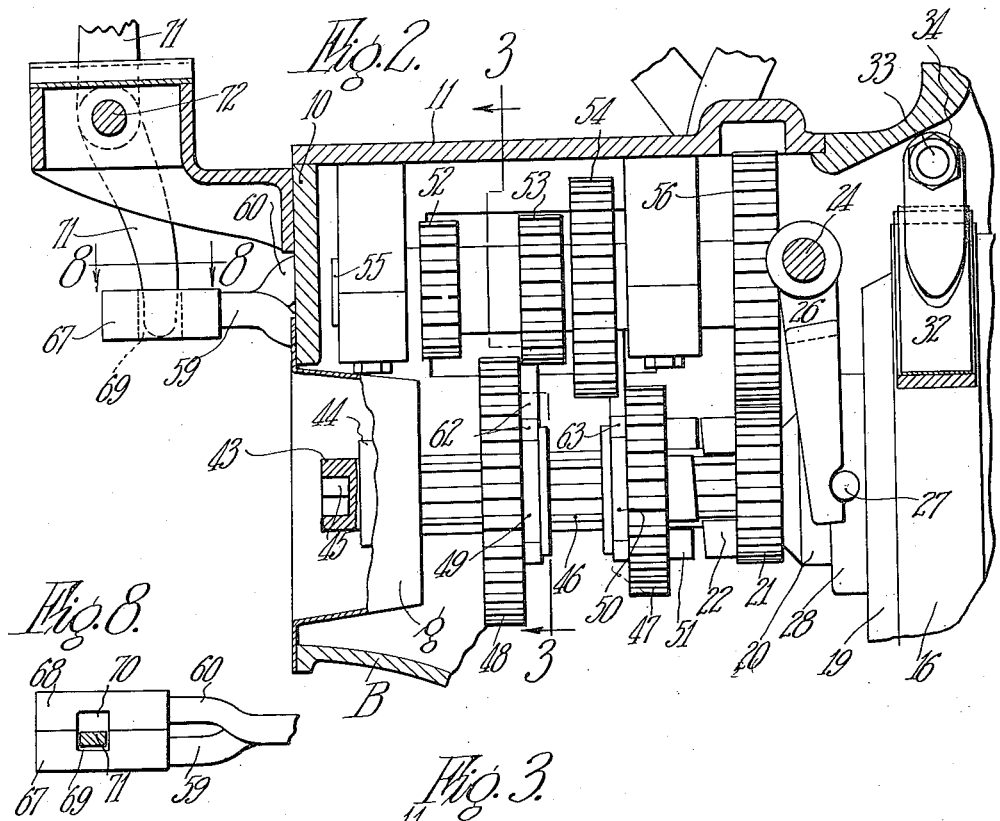
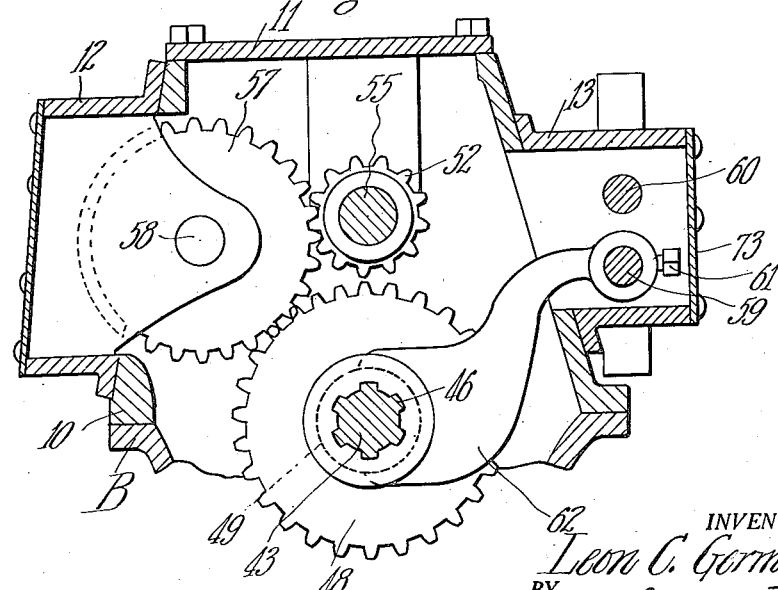

1,303,789.

Patented May 13, 1919.
3 SHEETS—SHEET 3.

INVENTOR.
Leon C. Germain.
BY
Chapin + Neal
ATTORNEYS.

UNITED STATES PATENT OFFICE.

LEON C. GERMAIN, OF CONWAY, MASSACHUSETTS.

TRANSMISSION.

1,303,789.	Specification of Letters Patent.	Patented May 13, 1919.

Application filed December 2, 1918. Serial No. 264,990.

*To all whom it may concern:*

Be it known that I, LEON C. GERMAIN, a citizen of the United States of America, residing at Conway, in the county of Franklin and State of Massachusetts, have invented certain new and useful Improvements in Transmissions, of which the following is a specification.

This invention relates to transmissions and more particularly to a transmission unit designed to replace the planetary transmissions of existing automobiles to render them more suitable for use in hilly localities or in drawing a trailer or heavy loads.

The present transmission unit is of the known sliding gear type and involves many elements commonly used in transmissions. The invention is largely based on a novel arrangement of these known elements into certain groups and on a novel manner of mounting and assembling the several groups in a main casing to the end that a transmission unit is provided, which may take the place of and be readily substituted for the planetary gear transmission of an existing automobile, and without material alteration of the parts of the automobile except for the removal of the old transmission and the substitution of the new.

To this end the invention has several features of novelty and utility which will appear from the following description and will be more particularly pointed out in the appended claims.

For the purposes of illustration, an embodiment of the invention, in a form at present preferred, has been shown in the accompanying drawings, in which:

Figure 1 is an exterior elevational view of the power plant of an automobile and shows the transmission unit as applied thereto;

Fig. 2 is an enlarged longitudinal sectional view of the transmission unit;

Fig. 3 is a cross sectional view taken on the line 3—3 of Fig. 2;

Fig. 4 is a longitudinal sectional view of the clutch unit of the transmission;

Fig. 5 is a fragmentary sectional view taken on the line 5—5 of Fig. 4;

Fig. 8 is a fragmentary sectional plan view taken on the line 8—8 of Fig. 2.

Figure 6:
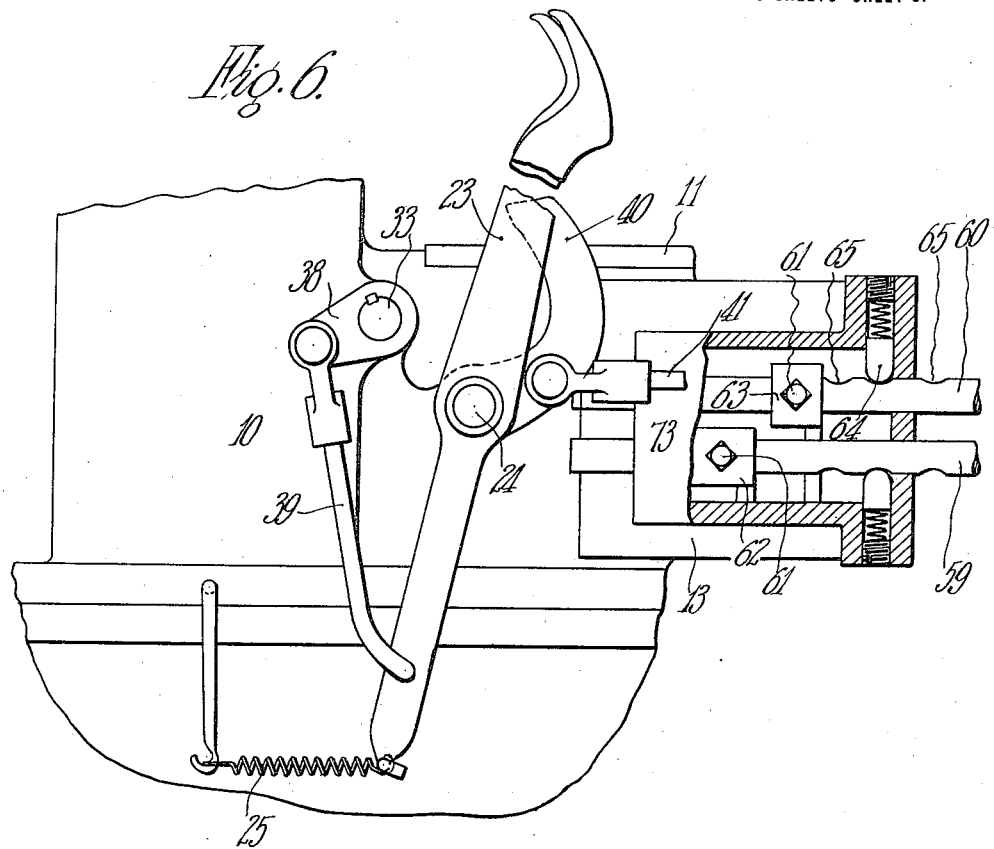
Fig. 6 is a fragmentary rear elevational view of the transmission unit.

Referring to these drawings and more particularly to Fig. 1: there is shown in conventional form a well-known type of automobile engine A. The crank case is designated B and extends rearwardly beyond the engine proper to form the lower part of the housing for the transmission. The upper part of the transmission housing is formed by a removable transmission cover which also encompasses the flywheel of the engine. The usual planetary gear transmission, including a clutch, is a unit which is connected at one end to the flywheel of the engine and is supported at the other end by the two mating halves of the transmission housing to which the drive shaft tube C is connected by a universal joint D.

According to my invention, I provide a casing 10 which is substituted for the transmission cover formerly used and completely houses a sliding gear transmission including a clutch, and the casing 10 is applied and functions in the same general manner as the usual transmission cover. The transmission mechanism includes five main groups,—a clutch group adapted for connection at one end with the engine flywheel, a driven shaft group supported at one end by the clutch group and having means at the other end to support it in the usual manner and to connect it to the drive shaft within tube C, a counter shaft group supported from a cover 11 removably secured to the casing 10, a reverse idler group mounted on a cover 12 removably secured to one side wall of casing 10, and a gear shifter group supported from a cover 13 (Figs. 3 and 6) removably secured to the other side wall of casing 10.

The clutch group will first be described with reference to Fig. 4. This group includes a flanged stud 14, which as indicated is adapted to be centrally secured at its flanged end to the flywheel E of the engine. To stud 14 is keyed a drum 15, and, loosely rotatable on the stud and held axially between the drum and a shoulder on stud 14, is a cup shaped drum 16, the periphery of which encompasses the drum 15. In the annular space between drums 15 and 16 are a series of clutch disks 17 alternate disks of the series being secured to the drum 15 and the remaining disks of the series to drum 16 in the manner usual in multiple disk clutch construction. An annular push ring 18 serves to force the several disks 17 into intimate and binding engagement, as will later appear. The open end of the drum 16 is substantially closed by a driving plate 19 secured thereto as indicated and the plate 19 has a hollow hub portion 20 to receive the free end of stud 14. Fixed to and forming a substantial continuation of the portion 20 is a driving gear 21, the end face of which is provided with clutch jaws 22, and both the gear and jaws function as driving elements as will later appear.

The clutch controlling mechanism consists of a foot pedal 23 (Fig. 6) which is fixed intermediate its ends to a shaft 24 rotatably mounted in casing 10. Pedal 23 is normally held in the illustrated position by a spring 25 which connects its lower extremity to a point on casing 10. Referring to Fig. 2, a forked arm 26 is fixed on shaft 24 within casing 10 and the lower divided ends of arm 26 are suitably shaped to engage pins 27 which protrude diametrically outward from a shift ring 28 slidably mounted (Fig. 4) on the described hub portion 20. Loosely mounted in an annular groove in the ring 28 is a ring 29 which carries a plurality of radial fingers 30 (Figs. 4 and 5) which are adapted to engage pins 31 on the push ring 18. The spring 25 is so arranged that the several clutch disks 17 are normally forced into engagement, whereby gear 21 and clutch jaws 22 may be driven from the engine flywheel E, and the disks 17 may be disengaged to open the clutch by pushing pedal 23 to the left as viewed in Fig. 6.

In order to stop the clutch drum 16 from spinning whenever the clutch is disengaged, a pivoted brake shoe 32 (Fig. 7) is arranged to engage the outer periphery of the drum. One end of a rod 33 mounted in casing 10 passes through the free end of shoe 32 and bears a nut 34. Near the other end of rod 33, there is fixed a cam element 35 which is arranged to coöperate with a cam 36 on casing 10 to move rod 33 axially whenever it is turned. A spring 37 coiled around rod 33 acts between the free end of shoe 32 and the interior wall of casing 10 to hold cams 35 and 36 in engagement and thus shoe 33 is held away from drum 16. On the outer end of rod 33 an arm 38 is fixed and such arm is connected by a link 39 (Fig. 6) to the clutch pedal 23 near its lower extremity. Thus, a forward push on pedal 23 will rock rod 33 in a counterclockwise direction and upon such movement cams 35 and 36 force rod 33 to the right (Fig. 7) and force shoe 32 against drum 16.

The clutch pedal shaft 24 may be used as a fulcrum for a second loosely mounted pedal 40 (Fig. 6) which may be connected by suitable links and levers, indicated in part at 41, to the service brakes on the rear wheels of the automobile, and if desired, the emergency brakes may be connected for operation from a lever 42 (Fig. 1) which is mounted near the rear end of casing 10.

The driven shaft group will next be described with particular reference to Figs. 2, 3 and 4. This group includes a shaft 43, which has a bearing at one end in the hollow hub of the driving gear 21 as clearly shown in Fig. 4. At the other end, the shaft is provided with a suitable bearing 44 which is supported in the usual manner in the inner cap $g$ of the universal joint housing, as indicated in Fig. 2. A portion of shaft 43 extends beyond bearing 44 into cap $g$ and has a square socket 45 to receive the squared end of the usual drive shaft in a now well-known manner. Intermediate its bearings shaft 43 is fluted to form a plurality of longitudinal keys 46 and slidable on the fluted portion are two gears 47 and 48 which are suitably recessed to receive the keys 46. The hubs of gears 47 and 48 are provided with circumferential grooves 50 and 49 respectively, to receive the forked ends of shifter arms to be later described. The gear 47 is also provided with clutch jaws 51 which are adapted to interlock with the jaws 22 on the driving gear 21, whereby the shaft 44 may be directly driven at crankshaft speed when desired.

The counter shaft group comprises three gears 52, 53, and 54 which are fixed in axially spaced relation on a shaft 55 which is supported in bearings depending from cover 11, and a driven gear 56 which meshes at all times with the described driving gear 21 to drive the counter shaft from the crankshaft of the engine, but at reduced speed.

The reverse idler group comprises merely an idler gear 57 mounted on a stud 58 which is journaled in suitable lugs on the inner face of cover 12, as shown in Fig. 3. Idler 57 is constantly in mesh with gear 52.

Figure 7:
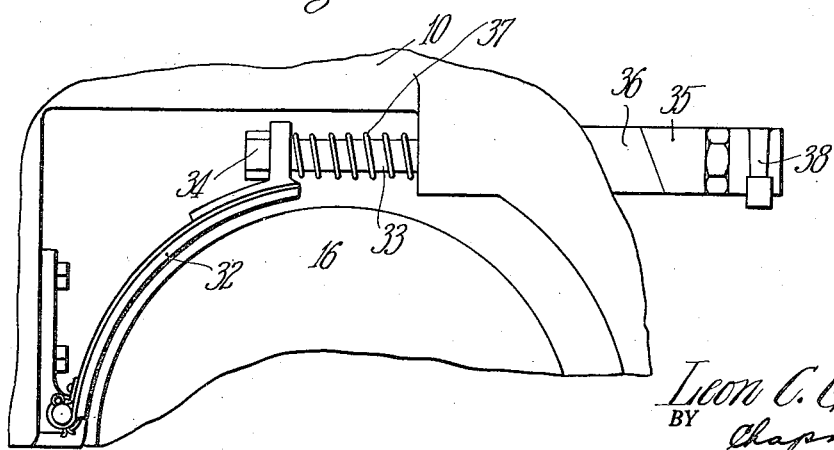
Fig. 7 is a fragmentary end elevational view thereof.

The gear shifter group will next be described with reference to Figs. 2, 3, 6, and 8. Two rods 59 and 60 are slidably mounted in the cover 13 and held to these rods, as by set screws 61, are shifter arms 62 and 63 respectively, which are adapted to engage in the described circumferential grooves 49 and 50. The shifter arms are shown in neutral position and each may be moved to both sides of such position. To releasably hold the arms in each of their three positions, spring pressed detents 64 are mounted in cover 13 to engage in notches 65 formed in the shifter rods, as shown in Fig. 6 in connection with rod 60. The rods 59 and 60 are at one end suitably bent as indicated in Figs. 2 and 8 to lie in closely spaced parallel relation and in a common horizontal plane. Blocks 67 and 68 are fixed to such ends of the rods 59 and 60 and are arranged to lie in contiguous relation. The adjacent faces of the blocks 67 and 68 are provided with notches 69 and 70 respectively, either one of which may receive the lower end of a clutch shifting lever 71. The latter, as indicated in Fig. 2, is loosely mounted on a shaft 72 carried by a suitable bracket secured to casing 10 and the lever is axially movable to permit its lower end to be engaged in either of the notches 69 and 70. The cover 13 has a removable plate 73 (Fig. 3) to permit access to the interior thereof for a reason to later appear.

In operation, the clutch pedal 23 and gear shifting lever 71 are operated in the usual manner to effect the speed changes. The speed changes are effected in the following manner. With the lever 71 positioned in notch 69, the block 67 may be moved to the right (Figs. 2 and 8) to cause gear 48 to mesh with gear 53, whereby low speed is obtained, and when block 67 is moved to the left, beyond its illustrated neutral position, gear 48 will be thrown into mesh with the reverse idler 58. Now with lever 71 engaged in notch 70, block 68 may be moved to the left to throw gear 47 into mesh with gear 54, for intermediate or second speed, and when block 68 is moved to the right beyond neutral position, the gear 47 is still out of mesh, but its clutch jaws 51 interlock with the jaws 22 to provide a direct drive for high speed.

The primary feature of the present invention consists in the provision of a specially formed casing, wherein a transmission mechanism is so arranged that the mechanism may be conveniently substituted for existing transmissions of the planetary type. The advantages of the casing structure and the group arrangement of transmission parts will best appear from a consideration of the manner of assembling the transmission unit in an existing automobile. Assuming that the usual planetary transmission has been removed including the transmission cover so that the crank case B is open and entirely free of parts from the flywheel E to the rear end of the casing, and assuming also that the drive shaft tube C is disconnected from crank case B at the universal joint D, the first step consists in connecting the stud 14 to flywheel E and assembling the clutch group thereon. The driven shaft group is next applied, the forward end of shaft 43 being first inserted in the hole in gear 21 after which the rear end, with the cap g thereon, may be moved into the illustrated position. The drive shaft tube is then applied in the usual way and bolted to crank case B, the squared end of the drive shaft therein having been inserted in recess 45. The casing 10, from which the covers 11, 12, and 13 have previously been removed, is next applied to cover the exposed portion of the crank case and the clutch and driven shaft groups. The cover 11 being removed, access to the interior of casing 10 is afforded so that the clutch shifting fork 25 may be held back during the application of the cover and so that the shift ring 28 may subsequently be turned to bring its pins 27 into the notches in the fork 25. The cover 11 is next applied to casing 10, and by reason of the opening afforded by the removal of casing 13, the gears 47 and 48 may be slid back and forth on shaft 44 to insure that they mesh properly with the gears 53 and 54 respectively. Then the cover 12 is applied to casing 10 to bring the reverse idler 58 into meshing engagement with gear 52 and the gear 48 may, as before, be slid along shaft 44 to insure that it meshes properly with the reverse idler. The shifter arms 62 and 63, having been removed from the rods 59 and 60, are next inserted through the opening afforded by the removal of cover 13 so that their forked ends engage in the grooves 49 and 50. The cover 13 is next bolted to the casing, after which the rods 59 and 60 may be successively slipped into place and through their respective shifter arms. The arms 62 and 63 are next secured to rods 59 and 60 respectively, by the set screws 61, and thereafter cover 73 is applied. The shifter lever 71 may then be inserted in the notches 69 or 70, its supporting bracket being removable to facilitate such action.

Thus, I have provided an improved transmission unit which is particularly designed to be substituted for the planetary transmissions of existing automobiles. It is recognized that modifications may be made in the structure herein described for illustrative purposes without departing from the scope of the invention which is to be defined by the appended claims rather than by the foregoing description.

What I claim is:—

1. A transmission unit, comprising, a casing open at the bottom and adapted to be applied as a cover for the rear portion of the crankcase of an existing automobile, and sliding gear transmission mechanism within said casing, said mechanism being provided with means adapted for connection to the power plant of the automobile and with other means adapted for connection with the drive shaft of the automobile.

2. A transmission unit, comprising, a casing open at the bottom and adapted to be substituted for the cover of the rear portion of the crankcase of an existing automobile, and transmission mechanism within said casing, said mechanism including a driving element adapted for connection to the power plant of the automobile, a driven element adapted for connection to the drive shaft of the automobile, a counter shaft geared up to said driving element and arranged above the driven element, a plurality of gears carried by the counter shaft, and a slidable gear on the driven element.

3. A transmission unit, comprising, a casing open at the bottom and adapted to be substituted for the cover of the rear portion of the crankcase of an existing automobile, and transmission mechanism within said casing, said mechanism including a driving shaft adapted for connection to the engine flywheel of the automobile, a shaft alined with the driving shaft, a clutch for connecting and disconnecting said shafts, a driving gear and clutch part carried by the second shaft, a driven shaft alined with the latter and provided with means for attachment to the drive shaft of the automobile, a counter shaft driven from said gear, other gears on the counter shaft, and slidable gears on the driven shaft each of which is movable to mesh with certain gears on the counter shaft and one of which carries a clutch part to mesh with the first-named part, whereby the driven element may be directly coupled to the second shaft.

4. A transmission unit, comprising, a casing open at the bottom and adapted to be substituted for the cover of the rear portion of the crankcase of an existing automobile, and transmission mechanism within said casing, said mechanism including a drive shaft adapted for connection to the power plant of the automobile, a second shaft alined with the driving shaft, coöperating clutch elements on said shafts, a driven shaft alined with the latter and provided with means to attach it to the drive shaft of the automobile, the clutch element of the second shaft formed with a brake drum, a brake shoe movable to engage the drum, a pedal mounted on the casing and operable when moved in one direction to disconnect the clutch elements, and means connecting said pedal and brake shoe to force the latter against said drum when the clutch elements are disconnected.

5. A transmission unit, comprising, a casing open at the bottom and adapted to be substituted for the member covering the rear portion of the crankcase of an existing automobile, and transmission mechanism within said casing and comprising, a driving group including a clutch and having means for attachment to the engine flywheel, a driven group including slidable gears and alined with the driving group, said driven group supported at one end by the driving group and having at the other end a part for attachment to the drive shaft of the automobile, a counter shaft geared up to the driving group and carrying other gears any one of which may drive a slidable gear, and a member supporting said counter shaft and removably mounted on the casing, whereby said shaft and its gears may be removed from or replaced in the casing as a unit.

6. A transmission unit, comprising, a casing open at the bottom and adapted to be substituted for the member covering the rear portion of the crankcase of an existing automobile, and transmission mechanism within said casing and comprising a driving group including a clutch and having means for attachment to the engine flywheel, a driven group including slidable gears and alined with the driving group, said driven group supported at one end by the driving group and having at the other end a part for attachment to the drive shaft of the automobile, a counter shaft geared up to the driving group and carrying other gears any one of which may drive a slidable gear, a member supporting said counter shaft and removably mounted on the casing, whereby said shaft and its gears may be removed from or replaced in the casing as a unit, mechanism to shift said slidable gears, a member carrying such mechanism and removably mounted on said casing, and a gear shifting lever removably mounted on the casing and having removable connection with said mechanism.

7. A transmission unit, comprising, a casing open at the bottom and adapted to be substituted for the member covering the rear portion of the crankcase of an existing automobile, and transmission mechanism within said casing and comprising a driving group including a clutch and having means for attachment to the engine flywheel, a driven group including slidable gears and alined with the driving group, said driven group supported at one end by the driving group and having at the other end a part for attachment to the drive shaft of the automobile, a counter shaft geared up to the driving group and carrying a plurality of gears, any one of which may drive a slidable gear, a member supporting said counter shaft and removably connected to the casing, a second member removably connected to the casing, and an idler gear mounted in the second member and in mesh with one of the gears on the counter shaft and adapted to mesh with one of said slidable gears.

8. A transmission unit, comprising, a casing open at the bottom and adapted to be substituted for the member covering the rear portion of the crank case of an existing automobile, removable cover plates on the top and both sides of said casing, a driving group of mechanism having at one end means for attachment to the power plant of the automobile, a driven group of mechanism supported at one end by a telescopic engagement with the driving group and having means at its other end for connection to the drive shaft of the automobile, a counter shaft driven from the driving group and supported by the top cover plate, driving gears fixed on the counter shaft, a reverse idler meshing with one of said gears and supported by one of the side cover plates, said driven group including slidable gears to mesh with certain of the gears on the counter shaft and one of which is adapted to mesh with the reverse idler, gear shifting mechanism carried by the other side cover plate, and a lever on the casing to operate said mechanism.

LEON C. GERMAIN.